United States Patent [19]

Ittel et al.

[11] Patent Number: 5,806,886
[45] Date of Patent: Sep. 15, 1998

[54] DEVICE FOR ABATING CARBON MONOXIDE IN AIRBAGS

[75] Inventors: Steven Dale Ittel, Wilmington, Del.; Gary William Nelb, West Chester, Pa.

[73] Assignee: E. I. du Pont de Nemours and Company, Wilmington, Del.

[21] Appl. No.: 614,757

[22] Filed: Mar. 13, 1996

Related U.S. Application Data

[63] Continuation-in-part of Ser. No. 314,733, Sep. 29, 1994, abandoned.

[51] Int. Cl.⁶ ................................................... B60R 21/28
[52] U.S. Cl. .......................... 280/741; 280/737; 422/177
[58] Field of Search .................................... 280/737, 741; 423/246, 247; 422/113, 177

[56] References Cited

U.S. PATENT DOCUMENTS

| | | | |
|---|---|---|---|
| 3,862,866 | 1/1975 | Timmerman | 280/741 |
| 3,986,456 | 10/1976 | Doin | 422/113 |
| 4,482,635 | 11/1984 | Herskovitz et al. | 436/134 |
| 4,895,389 | 1/1990 | Pack | 280/743 |
| 4,981,534 | 1/1991 | Scheffe | 280/741 |
| 5,160,163 | 11/1992 | Castagner | 280/741 |
| 5,275,433 | 1/1994 | Kloper | 280/741 |
| 5,308,588 | 5/1994 | Emery | 280/741 |
| 5,531,473 | 7/1996 | Rink | 280/737 |
| 5,582,806 | 12/1996 | Skanbery | 280/737 |
| 5,584,507 | 12/1996 | Khandhadia | 280/743.1 |

FOREIGN PATENT DOCUMENTS

| | | |
|---|---|---|
| 0 123 793 | 11/1984 | European Pat. Off. . |
| 2 312 477 | 12/1976 | France . |
| 2 682 374 | 4/1993 | France . |

OTHER PUBLICATIONS

Chan, T.L. et al, "Exposure Characterization of Aerosols and Carbon Monoxide from Supplemental Inflatable Restraint (Automotive Air Bag) Systems", *J. Aerosol Science*, 20(6), 657–665 (1989).

Zhizhina, E.G. et al, "Oxidation of CO to $CO_2$ by Heteropolyacids in the Presence of Palladium", *J. Mol. Catalysis*, 38(3), 345–353 (1986).

Ledesert, R.P.L. et al (Ed.), *Harrap's New Standard French and English Dictionary*, Part 1, vol. 2, p. 106 (1972).

Kirk–Othmer, "Explosive and Propellants", *Encyclopedia of Chemical Technology*, (3rd ed.), vol. 9, Wiley–Interscience Publication, 577–578 (1980).

Stcherbatcheff, G. Safety Res. Coordinator, "The Fully Integrated Air Bag System of the Renault 19", *Renault Airbag 2000 Conference*, Nov. 2/3, 1992.

Golodov, V.A., et al., "Catalytic Oxidation of CO by Heteropolyacids (HPA) and Dioxygen in the Presence of Pd(II) Salt–HPA–$H_2O$ System", *J. of Molecular Catalysis*, 35, 309–315 (1986).

Xu, X. et al, "An Infrared and Kinetic Study of CO Oxidation on Model Silica–Supported Palladium Catalysis from $10^{-9}$ to 15 Torr", *J. Phys. Chem.*, 97, 7711–7718 (1993).

(List continued on next page.)

*Primary Examiner*—Gary P. Straub
*Assistant Examiner*—Peter DiMauro

[57] ABSTRACT

The present invention provides improvements in a device and in a process for reducing the amounts of carbon monoxide and any oxides of nitrogen in an airbag inflated by a pyrotechnic inflator by exposing the combustion gases released by the explosion of the inflator, wherein carbon monoxide has been to a large extent oxidized to carbon dioxide with a first oxidizing agent, to a catalytic activation system of a supported palladium(II) salt in contact with a thermally stable second oxidizing agent, preferably an organic heteropolyanion capable of donating oxygen. In the device, the oxidant and the catalyst are protected by a thin, impermeable sheet from contact with surrounding atmosphere to prevent progressive deactivation prior to use.

10 Claims, 1 Drawing Sheet

OTHER PUBLICATIONS

Szanyi et al, "A Comparative Study of CO Adsorption and CO Oxidation on Model Silica Supported and Single Crystal Pd Catalysts", *Symp. on Chemistry & Characterization of Supported Metal Catalysts*, Presented before the Div. of Petroleum Chemistry, Inc., 206th Nat'l Mtg., ACS, Chicago, IL, pp. 834–836, Aug. 22–27, 1993.

Pavlova, S.N. et al, "Carbon Monoxide Oxidation by Oxygen in the Presence of Deposited Palladium + Molybdenum–Vanadium–Phosphorus Heteropolycomplex Catalyst. The State of the Heterocomplex n the Catalyst", Mar.–Apr. 1991.

Pavlova, S.N. et al, "Features of Low–Temperature Co Oxidation Catalysts Obtained by Depositing Palladium and Heteropolyacids on Silica Gel", Mar.–Apr. 1987.

DEVICE FOR ABATING CARBON MONOXIDE IN AIRBAGS

CROSS-REFERENCE TO RELATED APPLICATION

This is a continuation-in-part of my application Ser. No. 08/314,733 filed Sep. 29, 1994, now abandoned.

BACKGROUND OF THE INVENTION

This invention concerns a device and a process used therein for abating carbon monoxide in airbag restraint systems.

Airbag restraint systems are optional or required equipment in many automobiles around the world to provide protection in frontal impacts. Typically these airbags are inflated with a pyrotechnic device to provide the rapid inflation required.

In the United States, most of the bags are inflated with sodium azide pyrotechnic compositions. In several European countries the inflator utilized is a system based upon nitrocellulose which provides a cost-effective alternative to the sodium azide inflators. The resulting gas from nitrocellulose is relatively dust-free. However, as would be expected from the stoichiometry for even highly nitrated cellulose, the deficiency of oxygen in nitrocellulose-derived propellant has been found to generate high levels of carbon monoxide and possibly oxides of nitrogen in the airbag. It would be desirable to reduce these concentrations, and the device of the present invention and the process utilized therein will accomplish that reduction.

French Patent Application 2682374 discloses an airbag comprising an ignitor and a combustion chamber containing a pyrotechnic composition such as nitro-cellulose for producing gas in which the combustion gas is sequentially contacted with a perchlorate and an oxide of a metal selected from manganese, copper, cobalt and silver for the purpose of reducing carbon monoxide concentration.

French Patent Application 2312477 discloses an airbag using "propergol" as explosive, potassium perchlorate as oxidizer to reduce the carbon monoxide content, and potassium bicarbonate as a coolant.

Chan, T. L. et al., J. Aerosol Science, 20 657–665 report on a study of the characteristics of aerosols within airbags after deployment.

E. G. Zhizhina et al., J. Mol. Catalysis 38 (3), 345–53 report the oxidation of carbon monoxide to carbon dioxide in the presence of palladium catalysts and heteropolyacids in aqueous systems.

U.S. Pat. No. 4,482,635 to Herskovitz et al. discloses a composition and a process for detecting carbon monoxide, wherein the indicator composition consists essentially of fumed silica having dispersed thereon dry residues of impregnation with palladium sulfate, sulfuric acid, and ammonium molybdate. The composition changes color on exposure to CO.

The device of the present invention, to be contained within an airbag restraint system, is of small size and weight, low cost and easy fabrication. The device can sit unused in the steering column or elsewhere in a vehicle. The device may be unused for a number of years under a variety of conditions and retain its activity. Upon deployment of the airbag, the device must quickly reduce concentrations of CO therein.

SUMMARY OF THE INVENTION

This invention concerns an improvement in a process for reducing amounts of carbon monoxide and any oxides of nitrogen in an airbag inflated by a nitrocellulose inflator or other organic inflator which generates carbon monoxide as a side product, wherein the carbon monoxide and any oxides of nitrogen formed by combustion of the inflator are exposed to a first oxidizing agent capable of oxidizing most of said carbon monoxide to carbon dioxide; said improvement comprising exposing the combustion gases which have been contacted with said first oxidizing agent to a catalytic activation system which consists of a supported palladium (II) salt in contact with a thermally stable second oxidizing agent.

This invention also concerns an improved device, having a means for being positioned within an airbag, or inflating the airbag by means of combustion gases formed in an explosion of an inflator which also produces carbon monoxide, wherein a major part of carbon monoxide formed as a result of the combustion is oxidized to carbon dioxide by a first oxidizing agent laced in the path of said combustion gases; the improvement to the device further comprising:

(a) a catalytic activation system consisting essentially of a supported palladium(II) salt in contact with a thermally stable second oxidizing agent; and (b) a housing for enclosing said catalytic activation system, which housing is not in direct contact with the combustion gases already exposed to the first oxidizing agent, but which is hermetically sealed with a thin covering impermeable to gases, so as to protect the catalytic activation system from being prematurely deactivated by any carbon monoxide that may be present in the atmosphere; said covering being capable of rupturing as a result of the explosion of the inflator, creating at least one opening for permitting contact of the combustion gases with the catalytic activation system (a).

DESCRIPTION OF THE INVENTION

Figure 1:
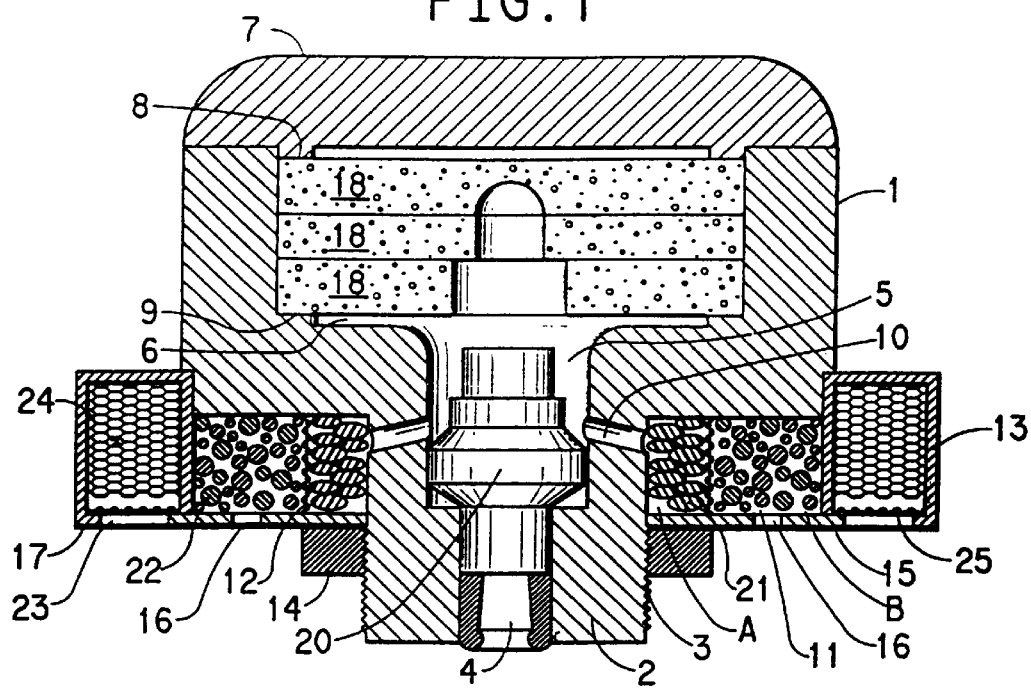
FIG. 1 is an axial cross-section of a first embodiment of a device of the present invention.

The proposed device comprises, as its essential component, palladium(II) salt catalyst on a ceramic, preferably silica, support, in contact with a stable, strong oxidant.

The ceramic support is preferably high surface area ceramic and is more preferably a high surface area silica. In a first embodiment of the invention, the ceramic support consists of a of high surface area silica monolith or a high surface area monolithic structure of silica powder held with a permeable matrix of polytetrafluoroethylene (PTFE). The support can also be a powder contained in a bag constructed from a permeable, inert, fibrous material such as glass fibers or mineral wool. The support further can be granulated material, which, in a second embodiment of the invention, can be designed to be dispersed into the bag when the bag is deployed.

The silica-supported palladium(II) salt will stoichiometrically convert carbon monoxide gas to carbon dioxide in an oxidative reaction.

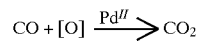

The silica-supported palladium(II) salt will stoichiometrically convert oxides of nitrogen to nitrogen gas in a reductive reaction.

$$NO_x \xrightarrow{Pd^{II}} N_2 + [O]$$

When these two reactants are stoichiometrically balanced, the overall reaction is $$CO + NO_x \xrightarrow{Pd^{II}} CO_2 + N_2$$

Carbon monoxide is generally present in much higher concentrations, and therefore it is necessary to provide a supplemental oxidant to speed the reaction and further lower the carbon monoxide concentration. Strong, stable oxidants of many types will work in the reaction. Strong, stable oxidants are those which are capable of rapidly oxidizing CO to $CO_2$ or $Pd^0$ to $Pd^{II}$, yet will not decompose when stored without stabilizers for periods of many years at temperatures as high as 100° C. Oxidants operable in the present invention include, but are not limited to, transition metal oxides. In general, peroxygens and high valency organic oxidants such as peracids or perborates do not have the required long-term stability. The preferred oxidants are a molybdenum-based heteropolyanions (HPAs) such as $H_3[Mo_{12}PO_{40}].nH_2O$ or $Na_4[Mo_{11}VPO_{40}].nH_2O$, but many alternative polyanions will work in this application. For example $Na_2MoO_4$, $Na_2WO_4$, $K_6Mo_7O_{24}$, $Na_5HW_6O_{21}$, $Na_6H_8Mo_7O_{28}$, $Na_6H_2W_{12}O_{40}$, $Na_4SiW_{12}O_{40}$, $Na_5Mo_{10}V_2PO_{40}$, $K_2Cr_2O_7$, $Na_2CrO_4$, $CrO_3$, $KMnO_4$, $K_4W_{10}V_2SiO_{40}$.

The oxidation reaction is accelerated on the surface of the catalyst by the heat generated during the pyrotechnical event, that is, the explosion of the nitrocellulose or other organic inflator, but it is possible to deactivate the catalyst by overheating. It is essential that the device be designed to divert most of the very hot gas away from the catalyst surface during inflation. Convective heating through the metal housing is sufficient to activate the catalyst.

This system would be reactive with, and thus could be deactivated by, any carbon monoxide or other reactive gases present in the automobile over its lifetime prior to its use. To prevent premature reaction with these gases and the resulting deterioration of efficacy, the device is hermetically sealed with a thin covering impermeable to gases. The seal can be made, for example, of a metallized polymer film such as aluminized polyester film or of a thin metal foil such as aluminum. Less preferred would be an impermeable silica-coated polymer film. This seal would prevent premature diffusion of gases to the device, but would be easily ruptured during inflation of the bag.

A prior art device described by Renault, S. A. at Airbag 2000 Conference in Karlsruhe, Germany, Nov. 2/3, 1992, has a ring of activated charcoal encased in a stainless steel screen surrounding the pyrotechnic composition. In practice, however, gas expansion is too rapid for the charcoal to act as an effective gas adsorbent during the actual detonation, though it may trap some particulates. The absorbency of the charcoal is too low and unspecific to trap much of the carbon monoxide after the reaction, and the heat of the reaction would actually disfavor absorption.

In the present device, the passively absorbing activated charcoal is replaced by a silica-supported palladium and heteropolyanion system which actively reacts with CO to form $CO_2$. The present improvement can be used in conjunction with any airbag inflation device which produces appreciable concentrations of carbon monoxide, but it can be easily explained and understood when compared with the device of French Application 2682374.

FIG. 1 is an axial cross-section of a first embodiment of the invention, which device can be placed in an airbag in the practice of the present invention. For example, the device of FIG. 1 can be seen as an improvement of the device illustrated and described in French Patent Application 2682374, which has been modified and adapted to serve the needs of the present invention.

The device comprises a cylindrical housing 1, which terminates at one end with a smaller diameter coaxial, cylindrical extension 2, provided with outer thread 3 over an end portion of its length. Housing 1 is divided into three, axially disposed cylindrical inner chambers of different diameters, namely, the smallest chamber 4, the intermediate chamber 5, and the largest chamber 6. Housing 1 is closed at its wider end with lid 7. As shown in FIG. 1, lid 7 has on its inner surface ribs 8, while the opposite surface of the largest chamber 6 has ribs 9. Openings 10 in the wall of the intermediate chamber 5 communicate with a coaxially placed doughnut-shaped container 11 divided by means of screen 12 into separate compartments A and B. The outer portion of container 11 is surrounded by another doughnut-shaped container 13, with which it does not communicate directly. The assembly of both containers 11 and 13 is held in place by means of nut 14. The common wall 15 of containers 11 and 13 is perforated by holes 16 and is covered on its outer surface with gas-impermeable covering 17, tightly sealed thereto, which can be, for instance, metal foil.

The pyrotechnic composition, nitrocellulose or similar material, is placed in chamber 6, which is the combustion chamber. The composition may be shaped into disks 18 having a full or partial opening in the center, which are stacked on top of one another.

Electric igniter 19 is tightly fitted by means of its wide section 20 into intermediate chamber 5, leaving openings 10 unobstructed. Igniter 19 is connected to an electric impulse generator (not shown), which causes the igniter to ignite pyrotechnic composition 18 in the event of impact on the automobile in which it is installed.

In the operation of the device, the gases formed by explosion of the pyrotechnic composition escape combustion chamber 6, travel through intermediate chamber 5, and enter section A of container 11, where are placed pellets of the first oxidizing agent such as, for example, an alkali metal or an alkaline earth metal perchlorate. The gases then pass through screen 12 into section B of container 11 containing granules 22 of a compound selected from one or more oxides of manganese, copper, cobalt, and silver. The explosion breaks sealing covering 17, opening holes 16. The combustion gases then escape through openings 16 into the airbag in which the device is placed and enter through circular opening 23, also made accessible by the explosion, into chamber 13, in which is placed catalytic activation system 24 of supported Pd(II) salt in contact with thermally stable second oxidizing agent such as, for example, a heteropolyanion. Chamber 13 also serves as a deflector, which forces the gases to first enter the bag before coming in contact with the Pd(II) catalyst.

The supported Pd(II) salt may be supported on a ceramic monolith, for example, a honeycomb structure, or may be in the form of a high surface area powder or granules. Powder normally would be placed in a porous pouch. The pouch or granules would be held in place by screen 25.

Figure 2:
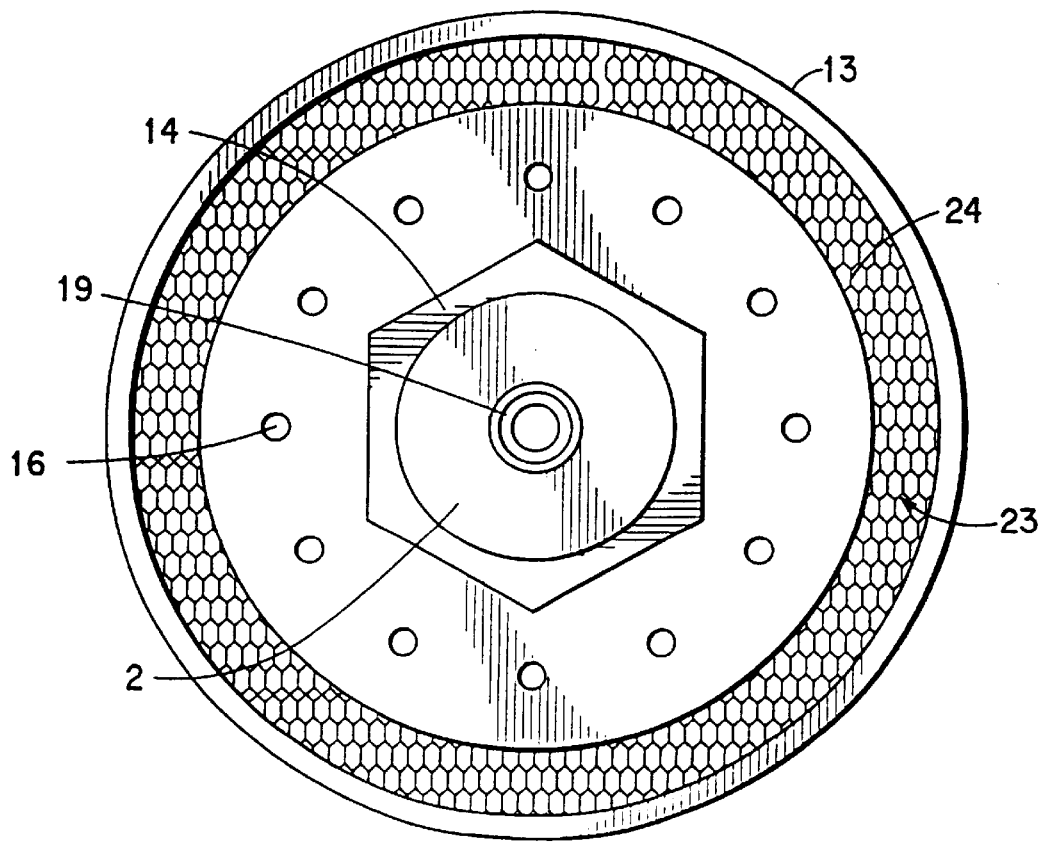
FIG. 2 is an end view of the device of FIG. 1.

FIG. 2 is an end view of the device of FIG. 1, shown without impermeable covering 17, wherein supported catalyst 24 is seen through circular opening 23, and openings 16 are shown in a concentric arrangement.

Preferably, a supported catalytic activation system is contained in a fibrous porous pouch protected by a stainless steel screen. Preferably, the pouch is constructed from an inorganic fiber such as glass fibers.

The carbon monoxide-reactive absorbent must be kept out of contact with a nitrocellulose inflator. Contact of a palladium-activated phosphomolybdate could ignite the nitrocellulose.

In a second embodiment of the invention, the device is much the same as shown in FIGS. 1 and 2. However, the catalyst and oxidant are present in the outer ring as a loose granular material, capable of being dispersed as particles, for example, particles of a dust or powder. The catalyst and oxidant comprising the particles are suitably on a ceramic, preferably silica, support, which, however, (in contrast to the first embodiment) is not in monolithic form. Also, rather than having the material constrained in the inflator by a wire screen, the only thing holding them in place may be the sealing covering, for example, a hermetically sealed foil.

In this second embodiment, when the bag is deployed, the sealing covering constraining the catalyst and oxidant is ruptured. The rapid turbulent flow around the inflator deploys at least an appreciable fraction of the catalyst/oxidant system into the bag. The fact that the catalyst system is not in direct line with the hot exiting gasses ensures that it will not become over-heated and deactivated. In this embodiment, the more intimate mixture of the catalyst system with the contents of the bag results in a more rapid oxidation of the CO to $CO_2$.

The size of the catalyst particles is selected so that the particles are sufficiently large to be filtered out by one or more filter units on the the bag. Typically, the filter unit is a filter panel on the bag which is more permeable, than the remainder of the bag, to the outside of the bag. This panel is used to allow the bag to vent very quickly after deployment. Being on the side of the bag away from the driver (or passenger), the panel vents the hot gasses away from the driver (or passenger). Such a filter means also can trap the particulate matter, including catalyst particles, which is ejected in to the bag during deployment.

It is helpful if the size of the catalyst particles is not too small; fines which could easily pass through the filter and enter the automobile interior are not acceptable, but the smaller the particle size, the more dispersed the catalyst system will be and the faster the reaction will be. It would be advantageous to use a narrow particle size range designed in relation to the porosity of the filter means.

As the bag deflates, filtration on the filter means will concentrate the catalyst at that point. This will serve to increase the amount of catalyst that the gasses must pass in order to exit the bag during deflation.

Examples of organic pyrotechnic compositions, for use in the present invention, which compositions also may generate carbon monoixde include, but are not limited to, nitrocellulose, mannitol hexanitrate, diazodintrophenol, and tetrazene. These various propellants provide differing concentrations of carbon monoxide in the bag when deployed. Some having a high nitrogen content also generate appreciable quantities of $NO_x$ (nitrogen oxides). The skilled artisan will readily understand that it may be desirable, depending on the particular pyrotechnic composition employed, to tune the ratio of nitrogen oxides to carbon monoxide in the system, since the nitrogen oxides can promote a rapid oxidation of the CO to $CO_2$.

It has been reported that concentrations of carbon monoxide produced in a nitrocellulose explosion can be as high as 46% (Kirk-Othmer Encyclopedia of Chemical Technology, 3rd Ed., Volume 9, Wiley Interscience 1980 Explosives and Propellants, page 578). However, French Patent Application 2682374 reports that the intitial concentration of carbon monoxide at the exit from the gas generating device, without any aftertreatment, was 5%. With the use of potassium perchlorate and a mixture of manganese, copper, cobalt, and silver oxides, this concentration could be reduced to 2.3%. These concentrations of CO in a 60 L sealed container, after cooling of gases, would result in concentrations of 1110 ppm and 510 ppm, respectively, in a sealed automobile having an interior volume of 2.7 $m^3$. The American Conference of Government Industrial Chemists Threshold Limit Value (TLV) for CO is 25 ppm. The amount of carbon monoxide in a proposed 30 L airbag at 2.3% CO would be approximately 0.03 mole or 0.9 g. A 1:1 stoichiometric reaction with phosphomolybdic acid would require almost 60 g of reagent. There are several factors that reduce the amount of reagent required. First, nitrogen oxides are also produced in the detonation of nitrocellulose. Oxides of nitrogen are capable of oxidizing carbon monoxide to carbon dioxide in the presence of a palladium catalyst. Thus, they would help reduce the quantity of heteropolyanion required.

A more significant factor is that heteropolyanions are multi-electron oxidants. They undergo rapid, reversible reductions for the first several oxygen atoms donated. The concentrations of carbon monoxide in the airbag can be halved several times in what would be near diffusion-controlled reactions, leading to a rapid decline in toxicity. After the initial several rapid oxygen atom transfers, slower oxygen atom transfers at lower oxidation potentials would continue to oxidize the carbon monoxide, reducing its concentration. Thus, 20 g of HPA could be sufficient to accomplish the reduction required.

EXAMPLES

The following representative examples illustrate the invention. All parts, proportions, and percentages are by weight, unless otherwise indicated.

Preparation of Oxidizing Composition:

Example 1

Palladium sulfate (3.6 g, 15 mmol) is dissolved in 50 g of concentrated sulfuric acid. This solution is diluted to 250 ml with distilled water. The resulting solution is added to a hot solution of ammonium molybdate —$(NH_4)_6(Mo_7O_{24})$, 150.0 g, 130 mmol, in 1 L of distilled water. The yellow-brown solution is then added slowly to a slurry of Cabosil® EH-5, Cabot Corp., fumed silica (400 g) in 5 L of water. The color changes from brown yellow to bright yellow. The water is then removed at approximately 90° C. under vacuum in a rotary evaporator. Final drying is accomplished under high vacuum. Finally, the resulting powder is ground and sieved through a No. 40 screen (0.42 mm sieve opening).

Example 2

Palladium sulfate (3.6 g, 15 mmol) is dissolved in 50 g of concentrated sulfuric acid. This solution is diluted to 250 ml with distilled water. The resulting solution is added to a hot solution of potassium permanganate (100.0 g, 633 mmol) in 1 L of distilled water. The violet-brown solution is then added slowly to a slurry of Cabosil EH-5 fumed silica (400 g) in 5 L of water. The water is removed at approximately 90° C. under vacuum in a rotary evaporator. Final drying is accomplished under high vacuum. Finally, the resulting powder is ground and sieved through a No. 40 screen (0.42 mm sieve opening).

Example 3

Palladium sulfate (3.6 g, 15 mmol) is dissolved in 50 g of concentrated sulfuric acid. This solution is diluted to 250 ml with distilled water. The resulting solution is added to a hot solution of chromium trioxide (100.0 g, 1 mol) in 1 L of distilled water. The red-orange solution is then added slowly to a slurry of Cabosil EH-5 fumed silica (400 g) in 5 L of water. The water is removed at approximately 90° C. under vacuum in a rotary evaporator. Final drying is accomplished under high vacuum. Finally, the resulting powder is ground and sieved through a No. 40 screen (0.42 mm sieve opening).

Example 4

A highly porous silica monolith is prepared by the controlled hydrolysis of tetraethyl orthosilicate. The wet monolith gel is contacted with a concentrated solution of ammonium molybdate and palladium sulfate of the composition of Example 1. The gel is then allowed to dry to an opaque solid. Finally, the resulting activated monolith is dried under vacuum for several days.

Carbon Monoxide Removal:

Example 5

A 2 g sample of the loose powder obtained in Example 1 is placed in an open boat and then transferred into a glass jar containing 4 L of carbon monoxide (23,000 ppm, 2.3%) in nitrogen gas. The sample immediately starts to turn blue and the concentration of carbon monoxide is reduced from 2.3% to 1000 ppm within a few minutes.

Similar results are obtained with the materials from Examples 2 and 3.

Example 6

Similar results are obtained with the the oxidizing compositions contained in porous pouches made from glass fibers, polytetrafluoroethylene fibers, or refractory oxide fibers.

Such organic fibers as tea paper and, to a lesser extent, polyethylene or other organic fibers, are not desirable because they would be degraded by the strongly oxidizing system and could even undergo spontaneous ignition.

Example 7

The activated silica monolith of Example 4 is placed into a glass jar containing 4 L of carbon monoxide, 2.3% (23,000 ppm), in nitrogen gas. The sample immediately starts to turn blue and the concentration of carbon monoxide is quickly reduced from 2.3%.

Example 8

During the preparation of a sample as in Example 1, a dispersion of DuPont's Teflon polytetrafluoroethylene in water is added to the mixture. The powder which results from drying of the resulting mixture is pressed into a slightly flexible porous sheet. A bar cut from the sheet is transferred into a glass jar containing 4 L of carbon monoxide, 2.3%, in nitrogen gas. The sample immediately starts to turn blue and the concentration of carbon monoxide is reduced from 2.3% to 1000 ppm within a few minutes.

Similar results will be obtained with the materials from Examples 2 and 3.

Example 9

A larger bar from the sheet in Example 8 is placed into a nylon bag which has been expanded by the detonation of trinitrated cellulose. The concentration of CO in the bag, as monitored continuously by an Interscan® Carbon Monoxide Monitor manufactured by Interscan Corporation, Chatsworth, Calif., is reduced within a few minutes to 10% of the initial concentration.

What is claimed is:

1. A device, having a means for being positioned within an airbag, for inflating the airbag by means of combustion gases formed in an explosion of a nitrocellulose inflator, wherein a major part of carbon monoxide formed as a result of the combustion is oxidized to carbon dioxide by a first oxidizing agent placed in the path of said combustion gases; the improvement to the device further comprising:

(a) a catalytic activation system consisting essentially of a supported palladium(II) salt in contact with a thermally stable second oxidizing agent; and (b) a housing for enclosing said catalytic activation system, which housing is not in direct contact with the combustion gases already exposed to the first oxidizing agent, and which is hermetically sealed with a covering impermeable to gases, so as to protect the catalytic oxidation system from premature deactivation by any carbon monoxide that may be present in the atmosphere; said covering being capable of rupturing as a result of the explosion of the inflator, creating at least one opening for permitting contact of the combustion gases with the catalytic activation system (a).

2. A device, having a means for being positioned within an airbag, for inflating the airbag by means of combustion gases formed in an explosion of an organic inflator which produces carbon monoxide as a side product, wherein a major part of the carbon monoxide formed as a result of the combustion is oxidized to carbon dioxide by a first oxidizing agent placed in the path of said combustion gases; the improvement to the device further comprising:

(a) a catalytic activation system consisting essentially of a supported palladium(II) salt in contact with a thermally stable second oxidizing agent; and (b) a housing for enclosing said catalytic activation system, which housing is not in direct contact with the combustion gases already exposed to the first oxidizing agent, and which is hermetically sealed with a covering impermeable to gases, so as to protect the catalytic oxidation system from premature deactivation by any carbon monoxide that may be present in the atmosphere; said covering being capable of rupturing as a result of the explosion of the inflator, creating at least one opening for permitting contact of the combustion gases with the catalytic activation system (a).

3. A device according to claim 1 or 2 wherein the catalytic activation system is supported on a ceramic material.

4. A device according to claim 3 wherein the ceramic material is high surface silica.

5. A device according to claim 3 wherein the ceramic material is a monolith.

6. A device according to claim 3 wherein the ceramic material is a powder contained in a porous fibrous pouch which is protected by a stainless steel screen.

7. A device according to claim 5 where the fibrous pouch is constructed from an inorganic fiber.

8. A device according to claim 3 wherein the ceramic material is in the form of granules.

9. A device according to claim 1 or 2 wherein the activation system is constrained by a hermetic seal which is designed to rupture when the bag is deployed, thereby dispersing at least a substantial portion of the catalytic activation system, in the form of particles, such that they are intimately mixed with the contents of the bag.

10. A device according to claim 1 or 2 wherein the covering impermeable to gases is made from a material selected from the group consisting of metallized polymer film, impermeable silica-coated polymer film, and a metal foil.

* * * * *